United States Patent [19]

Ho et al.

[11] Patent Number: 5,264,494
[45] Date of Patent: Nov. 23, 1993

[54] HALOGENATED BUTYL RUBBER GRAFT COPOLYMERS

[75] Inventors: Chai H. Ho, London; William Hopkins, Sarnia, both of Canada

[73] Assignee: Polysar Rubber Corporation, Sarnia, Canada

[21] Appl. No.: 700,667

[22] Filed: May 15, 1991

[51] Int. Cl.$^5$ .......................... C08L 9/00; C08L 47/00
[52] U.S. Cl. ................................... 525/237; 525/235; 525/232; 525/242; 525/244; 525/245; 525/248; 525/250
[58] Field of Search ............... 525/237, 235, 250, 232, 525/242, 244, 245, 248

[56] References Cited

U.S. PATENT DOCUMENTS

| | | | |
|---|---|---|---|
| 3,904,708 | 9/1975 | Kennedy et al. | 525/249 |
| 5,071,913 | 12/1991 | Powers et al. | 525/87 |

FOREIGN PATENT DOCUMENTS

| | | |
|---|---|---|
| 810741 | 4/1969 | Canada. |
| 448902 | 10/1991 | European Pat. Off.. |
| 878150 | 9/1961 | United Kingdom. |
| 1139556 | 1/1969 | United Kingdom. |
| 1097997 | 1/1988 | United Kingdom. |

OTHER PUBLICATIONS

Journal of Polymer Science, vol. 6, No. 10, Oct. 1968 pp. 2773–2783; Y. Minoura et al. "Reaction of Chlorine-Containing Polymers with Living Polymers".
Polymer Letters vol. 5 pp. 641–646 (1967) "Graft Copolymers of Rubbers and Polystyrene Prepared with Living Polymers".

*Primary Examiner*—John Kight, III
*Assistant Examiner*—Duc Truong
*Attorney, Agent, or Firm*—Joseph C. Gil; Godfried R. Akorli

[57] ABSTRACT

A process for grafting halogenated butyl rubbers with polymers based on conjugated diolefin monomers is provided which comprises mixing a first solution of halogenated butyl rubber with a second solution of a living alkali metal terminated polymer based on conjugated diolefin monomers and having a number average molecular weight of at least 40,000 at a temperature of from about −10° C. to about 80° C. for a period of time of from about 30 minutes to about 24 hours whereby the graft copolymer is formed. Rubber compositions comprising the halogenated butyl rubber graft copolymers upon vulcanization exhibit improved abrasion resistance and wet skid resistance while a desirable balance of other physical properties is maintained.

22 Claims, No Drawings

HALOGENATED BUTYL RUBBER GRAFT COPOLYMERS

FIELD OF INVENTION

This invention relates to a process for the grafting on to halogenated butyl rubbers of polymers based on conjugated diolefin monomers and the use of these graft copolymers in rubber compositions that upon vulcanization exhibit improved physical properties.

BACKGROUND OF THE INVENTION

With the increasing demand for automobile safety and low fuel consumption, specifications for the tread rubber compounds have become more demanding. Tire treads are required to be very tough and very wear resistant, have a high degree of traction on both wet and dry surfaces, provide low rolling resistance and heat build up and retain their rubbery characteristics over a wide temperature range. However some of these requirements are essentially incompatible with one another.

The addition of a halogenated butyl rubber to the tread formulation of a tire leads to an improvement in the wet skid resistance of the tire tread but there is a concomitant reduction in the wear resistance of the tire tread. Thus it would be desirable if the halogenated butyl rubber could be modified in a manner such that when used in a tire tread formulation, the improved wet skid resistance is retained and additionally there is improved wear resistance while a desirable balance of the other physical properties is maintained.

DESCRIPTION OF PRIOR ART

As butyl rubbers have a very low level of unsaturation they do not have good compatibility with highly unsaturated rubbers such as polybutadiene or styrene-butadiene copolymers. Consequently several different grafting procedures have been developed by means of which further unsaturation may be introduced. However these procedures have deficiencies in that cross-linking reactions often occur during the grafting and both the length and the distribution of the side chains grafted to the polymer backbone are not easily controlled.

United Kingdom Patent 878,150 (Burke) discloses that 100 parts by weight butyl rubber with a mole percent unsaturation of less than 5 percent can be grafted with from 0.5 to 100 parts by weight of a diene such as butadiene using a free radical generating catalyst.

In United Kingdom Patent 1,139,556 (Danmiller et al) it is taught that unsaturated isobutylene graft copolymers can be produced by the polymerization of 5 to 95 weight percent isobutylene with 95 to 5 weight percent of a diene polymer containing from 1 to $1 \times 10^{-6}$ halogen atoms per monomer unit in the presence of a Lewis acid at a pressure from 1 to 10 atmospheres at a temperature of $-150°$ C. to $-30°$ C.

Canadian Patent 810,741 teaches that 1,3-dienes can be grafted on to isobutylene polymers by reacting the 1,3-dienes with the product of the reaction of a halogenated butyl polymer with a Lewis acid or a Lewis acid-Ziegler Natta catalyst mixture.

Brooks in Polymer Letters Vol. 5 pgs. 641–646 (1967) teaches that living polystyrene can be grafted on to brominated rubbers such as brominated butyl rubber.

In U.S. Pat. No. 3,904,708 (Kennedy et al) it is disclosed that a graft copolymer can be prepared by reacting a cationically polymerizable monomer such as dimethylbutadiene with a halogenated butyl rubber in the presence of an aluminum alkyl catalyst at a temperature of from about $-90°$ C. to about $70°$ C.

SUMMARY OF THE INVENTION

It is an objective of the present invention to provide a process for the preparation of graft copolymers of halogenated butyl rubbers and polymers based on conjugated diolefin monomers without the formation of a substantial amount of gel.

It is a further objective of this invention to provide rubber compositions comprising graft copolymers of halogenated butyl rubbers and polymers based on conjugated diolefin monomers which exhibit improved abrasion resistance and wet skid resistance upon vulcanization.

Accordingly in one aspect our invention provides a process for preparing graft copolymers of halogenated butyl rubbers and polymers based on conjugated diolefin monomers without the formation of a substantial amount of gel which process comprises:

(i) providing a first solution in an inert organic solvent of a halogenated butyl rubber selected from the group consisting of chlorinated butyl rubber and brominated butyl rubber, the amount of halogenated butyl rubber in said solution being from about 0.5 to about 5 parts by weight per 100 parts by weight of inert organic solvent, (ii) providing a second solution compatible with said first solution in an inert organic solvent which may or may not be the same as the inert organic solvent of step (i) of a living alkali metal terminated polymer based on conjugated diolefin monomers and having a number average molecular weight of at least 40,000, the amount of said living alkali metal terminated polymer in said second solution being from about 1 to about 20 parts by weight per 100 parts by weight of inert organic solvent, (iii) mixing at a temperature of from about 31 10° C. to about 80° C. for a time period of from about 30 minutes to about 24 hours said first solution with said second solution in relative proportions whereby the weight of grafted polymer based on conjugated diolefin monomers is from about 5 to about 55 weight percent of the total of halogenated butyl rubber and said grafted polymer, and (iv) recovering from the solution the graft copolymer.

In another aspect our invention provides a rubber composition having improved abrasion resistance and wet skid resistance upon vulcanization, said composition comprising:

(i) about 10 to about 50 parts by weight of a graft copolymer consisting essentially of a halogenated butyl rubber having grafted thereon a polymer based on conjugated diolefin monomers and having a number average molecular weight of from about 55,000 to about 200,000, said polymer based on conjugated diolefin monomers selected from the group consisting of butadiene rubber, isoprene rubber, styrene-butadiene random and block rubbery copolymers, styrene-isoprene-butadiene rubber, and mixtures thereof, (ii) about 50 to about 90 parts by weight of at least one rubber selected from the group consisting of butadiene rubber, styrene-butadiene random and block rubbery copolymers, natural rubber and isoprene rubber, for a total of 100 parts by weight of (i) and (ii), (iii) about 30 to about 150 parts by weight of at least one carbon black based on 100 parts by weight of the total of (i) and (ii), and (iv) vulcanization reagents

DETAILED DESCRIPTION OF THE INVENTION

The essence of this invention lies in providing a process whereby a halogenated butyl rubber is grafted with a polymer based on conjugated diolefin monomers without a substantial amount of gel being formed during the process.

The halogenated butyl rubbers suitable for use in this invention are obtained by halogenation of butyl rubber which is a copolymer of isobutylene and a $C_4$ to $C_6$ conjugated diolefin, preferably isoprene.

Chlorinated butyl rubber typically contains from about 1 to about 3 weight percent of isoprene and from about 97 to about 99 weight percent of isobutylene based on the hydrocarbon content of the polymer and from about 0.5 to about 2.5 weight percent of chlorine based on the chlorobutyl polymer. A typical chlorobutyl polymer has a molecular weight expressed as the Mooney (ML 1+8 at 125° C.) of from about 35 to about 55.

Brominated butyl rubber typically contains from about 1 to about 3 weight percent of isoprene and from about 97 to about 99 weight percent of isobutylene based on the hydrocarbon content of the polymer, and from about 1 to about 4 weight percent bromine based on the bromobutyl polymer. A typical bromobutyl polymer has a molecular weight, expressed as the Mooney (ML 1+8 at 125° C.), of from about 35 to about 55.

In the process of the present invention the halogenated butyl rubber is preferably a chlorinated butyl rubber containing from about 1 to about 2 weight percent of isoprene and from about 98 to 99 weight percent of isobutylene based on the hydrocarbon content of the polymer and from about 0.75 to about 1.75 weight percent of chlorine based on the chlorinated butyl polymer.

The living alkali metal terminated polymers which can be grafted on the halogenated butyl rubber in accordance with the process of the present invention are derived from at least one conjugated diolefin monomer and optionally may also contain one or more vinyl aromatic monomers. Accordingly the polymers are prepared by the anionic polymerization using an alkyl-alkali metal catalyst of at least one conjugated diolefin monomer or by the copolymerization of one or more conjugated diolefin monomers with one or more vinyl aromatic monomers to afford random or block copolymers.

The conjugated diolefins which can be anionically polymerized generally have the structural formula:

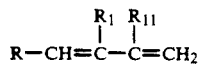

wherein R is a hydrogen atom or an alkyl group containing from 1 to 8 carbon atoms and wherein $R_1$ and $R_{11}$ can be the same or different and are selected from the group consisting of hydrogen atoms and alkyl groups containing from 1 to 4 carbon atoms. Some representative nonlimiting examples of suitable conjugated diolefins include 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like. Conjugated diolefin monomers containing from 4 to 8 carbon atoms are preferred, 1,3-butadiene and isoprene being especially preferred.

The vinyl aromatic monomers which can optionally be used are selected so as to be copolymerizable with the conjugated diolefin monomers being employed. Generally, any vinyl aromatic monomer which is known to polymerize with organo alkali metal initiators can be used. Such vinyl aromatic monomers usually contain from 8 to 20 carbon atoms, preferably from 8 to 14 carbon atoms. Some examples of vinyl aromatic monomers that can be copolymerized to afford the living alkali metal terminated polymers for use in the present invention include styrene, -methyl styrene, various alkyl styrenes, p-methoxy styrene, 1-vinylnaphthalene, 2-vinyl naphthalene, 4-vinyl toluene and the like. Styrene is preferred for copolymerization with 1,3-butadiene alone or for terpolymerization with both 1,3-butadiene and isoprene.

The relative amount of conjugated diolefin monomers and vinyl aromatic monomers employed can vary over a wide range. However, in general at least about 50 mole percent conjugated diolefin monomers are required in order to produce a rubbery copolymer. Thus the mole ratio of conjugated diolefin monomers to vinyl aromatic monomers will be in the range of about 50:50 to 99:1. More typically the mole ratio of conjugated diolefin monomers to vinyl aromatic monomers will be in the range of 65:35 to 95:5.

The living alkali metal terminated polymers based on conjugated diolefin monomers used in the process of the present invention can be produced utilizing techniques that are well known to persons skilled in the art. The initiator used in initiating the polymerization of the monomer or mixture of monomers may be selected from the group of metals consisting of barium, lithium, magnesium, sodium and potassium; lithium and magnesium being the metals most commonly utilized. Organolithium compounds, however, are the preferred initiators for use in such polymerizations and can be represented by the formula R-Li, wherein R represents a hydrocarbyl group containing from 1 to about 20 carbon atoms, preferably from 1 to 10 carbon atoms.

Some representative examples of preferred organolithium compounds include methyllithium, ethyllithium, isopropyllithium, n-butyl-lithium, sec-butyllithium, n-hexyllithium, n-octyllithium, phenyllithium, 1-naphthyllithium and tolyllithium, sec-butyllithium being highly preferred as an initiator.

The amount of organolithium initiator used will vary depending upon the molecular weight desired for the polymer being synthesized as well as the polymerization temperature which is to be used. The precise amount of organolithium compound required to produce a polymer of a desired molecular weight can be easily ascertained by persons skilled in the art. However, as a general rule from about 0.1 to about 2 parts by weight of an organolithium initiator per 100 parts by weight of monomers will be used to prepare a living polymer based on conjugated diolefin monomers for use in the process of the present invention.

The vinyl content in the conjugated diolefin portion of the polymer chain may be controlled by the use of a microstructure controlling agent such as an ether or a tertiary amine. Representative nonlimiting examples of ethers that may be used as microstructure controlling agents include dioxane, tetrahydrofuran and derivatives thereof, ethylene glycol diethyl ether, ethylene glycol diethyl ether, diethylene glycol dimethyl ether, triethylene glycol dimethyl ether and derivatives thereof or the like. Representative nonlimiting examples of tertiary amines include triethylamine N,N,N$^1$N$^1$-tetramethylethylenediamine and the like. The amount of the microstructure controlling agent varies depending upon the microstructure of the desired conjugated diolefin containing polymer or the conjugated diolefin-vinyl substituted aromatic monomer copolymer and it is in the range of from 0.05 to 2,000 moles, preferably 0.2 to 1,000 moles per mole of organometallic catalyst.

The polymerization process can be carried out at any temperature within the range of about $-80°$ C. to about $150°$ C. but preferably the polymerization process is carried out at a temperature of about $-20°$ C. to about $80°$ C.

The process of the present invention for grafting halogenated butyl rubbers with polymers based on conjugated diolefin monomers is a solution process. Preparatory to reaction with the living polymer, the halogenated butyl rubber is preferably purified by a series of steps comprising dissolution of the rubber in an inert organic solvent which may be a saturated aliphatic hydrocarbon such as heptane or hexane; an aromatic hydrocarbon such as toluene or mixed xylenes; an alicyclic hydrocarbon such as cyclohexane or methyl cyclohexane and mixtures thereof, followed by successive washings with a basic solution, an acidic solution and water. Preferably the solution of the rubber in an inert organic solvent is washed successively with an aqueous sodium hydroxide solution of about 10 weight percent, an aqueous hydrochloric acid solution of about 5 weight percent, an aqueous hydrochloric acid solution of about 5 weight percent and water. Any residual impurities that may still be present in the rubber solution such as calcium stearate, as well as traces of residual water are then removed by centrifugation. Purification in this manner thereby ensures that any impurities that may have been present in the halogenated butyl rubber will not contribute to the destruction of the living alkali metal terminated polymer based on conjugated diolefin monomers during the grafting process.

While the inert organic solvent may be removed from the solution of halogenated butyl rubber under reduced pressure and the rubber then redissolved in the same or another inert organic solvent to afford a rubber solution of the desired concentration, it is preferable that additional inert organic solvent simply be added to the purified solution of halogenated butyl rubber to achieve the desired concentration of about 0.5 to about 5 parts by weight of said halogenated butyl rubber per 100 parts by weight of inert organic solvent, to which a positive pressure of an inert gas such as argon, nitrogen or the like may subsequently be applied. Preferably the inert organic solvent is selected from hexane, heptane, cyclohexane, methylcyclohexane and mixtures thereof.

To this solution of purified halogenated butyl rubber there is added with agitation a solution of the living alkali metal terminated polymer based on conjugated diolefin monomers in an inert organic solvent which may or may not be the same as the inert organic solvent in which the halogenated butyl rubber is dissolved and which is compatible with said halogenated butyl rubber solution. The living polymer in this solution need not be just a single living polymer but may be a mixture of living polymers. The concentration of said living polymer in said inert organic solvent is from about 1 to about 20 parts by weight per 100 parts by weight of inert organic solvent.

The living polymer based on conjugated diolefin monomers is conveniently used in the form in which it is prepared; that is the solution of the living polymer of the desired molecular weight and concentration to be used in grafting process is that obtained upon the anionic polymerization of the conjugated diolefin monomer or mixture of conjugated diolefin and vinyl aromatic monomers in an inert organic solvent using an organo-metallic catalyst.

The number of graft sites and thus the amount of living alkali metal terminated polymer required for formation of the graft copolymers of the present invention is regulated by the halogen content of the halogenated butyl rubber, that is a halogenated butyl rubber which contains a large amount of halogen offers a large number of sites for the grafting reaction whereas a halogenated butyl rubber which contains only a small amount of halogen offers correspondingly fewer graft sites.

In the process of the present invention it is not contemplated that every halogen atom present in the base halogenated butyl rubber be replaced by a graft polymer based on conjugated diolefin monomers. Thus the amount of living alkali metal terminated polymer required for formation of the graft copolymer is determined by both the halogen content of the halogenated butyl rubber and the number of grafts required. Preferably the weight of polymer based on conjugated diolefin monomers grafted on the halogenated butyl rubber is from about 5 to 55 weight percent of the total of the halogenated butyl rubber and the grafted polymer.

This solution obtained upon addition of the solution of the living alkali metal terminated polymer to the solution of the halogenated butyl rubber is then agitated for about 30 minutes to about 24 hours at a temperature of from about $-10°$ C. to about $80°$ C. to ensure that reaction between the two polymeric systems occurs. Subsequently the grafting reaction is terminated by the addition of a small amount of an organic liquid such as mthanol, isopopanol or acetone.

The efficiency of the grafting reaction is influenced not only by the purity of the halogenated butyl rubber solution but also by the concentration of the halogenated butyl rubber and the living alkali metal terminated polymer in solution. Thus in order to ensure that the grafting reaction between the halogenated butyl rubber and the living polymer occurs without the formation of a substantial amount of gel it is preferable that the total amount of halogenated butyl rubber and the living polymer in solution is from about 1 to about 10 parts by weight per 100 parts by weight of inert organic solvent.

On completion of the reaction suitable stabilizers and antioxidants are added to the graft copolymer. Examples of suitable stabilizers include calcium stearate and epoxidized soyabean oil, preferably used in the amount of about 0.5 to 5 parts by weight per 100 parts by weight of the graft copolymer. Suitable antioxidants include sterically hindered phenols, preferably used in the amount of about 0.05 to 2 parts by weight per 100 parts by weight of the graft copolymer.

Recovery of the graft copolymers produced in the process disclosed herein is achieved by conventional techniques used to recover polymers including (i) contacting the polymer solution with steam thereby flashing off the solvent (ii) passing the wet polymer over a screen or filter in order to recover the polymer and (iii) passing the polymer through a tunnel dryer or extruder. The graft copolymer may also be recovered by coagulation with an excess of an organic liquid in which the graft copolymer is sparingly soluble, examples of such a liquid being methanol isopropanol or acetone.

Rubber compositions in which a graft copolymer consisting essentially of a halogenated butyl rubber grafted with a polymer having a number average molecular weight of from about 55,000 to about 200,000 and based upon conjugated diolefin monomers is compounded with at least one rubbery polymer selected from the group consisting of butadiene rubbers, styrene-butadiene random and block copolymers and styrene-isoprene-butadiene random and block copolymers and styrene-isoprene-butadiene rubber, and with carbon black and vulcanization agents, have been found, upon vulcanization, to exhibit improved abrasion resistance and wet skid resistance relative to simple mechanical blends of the component polymers. Preferably about 10 to about 50 parts by weight of the graft copolymer is compounded with about 50 to about 90 parts by weight of at least one rubbery polymer for a total of 100 parts by weight of the total of the graft copolymer and rubbery polymers.

The graft copolymer consisting essentially of a halogenated butyl rubber grafted with a polymer based on conjugated diolefin monomers may be prepared by the aforementioned process wherein a first solution of the halogenated butyl rubber in an inert organic solvent is mixed with a second solution of a living alkali metal terminated polymer based upon conjugated diolefin monomers in an inert solvent compatible with said first solution at a temperature of from about −10° C. to about 80° C. for a time period of from about 30 minutes to about 24 hours to effect grafting and the graft copolymer is subsequently recovered.

The halogenated butyl rubber onto which is grafted the polymer based on conjugated diolefin monomers is selected from chlorinated butyl rubber and brominated butyl rubber and is preferably a chlorinated butyl rubber having a chlorine content of from about 0.75 to about 1.75 weight percent chlorine based on the chlorinated butyl rubber.

The polymer based on conjugated diolefin monomers grafted onto the halogenated butyl rubber is selected from the group consisting of butadiene rubbers, styrene-butadiene random and block rubbery copolymers, styrene-isoprene-butadiene rubber and mixtures thereof, preferably from the group consisting of butadiene rubbers, styrene-butadiene random copolymers and mixtures thereof, and more preferably from butadiene rubbers.

Vulcanizates of tire tread formulations comprising the graft copolymer have been found, relative to tire tread formulations comprising a simple mechanical blend of the component polymers, to exhibit improved abrasion resistance while maintaining comparable wet skid resistance and a desirable balance of the other physical properties when the number average molecular weight of the polymer based on conjugated diolefin monomers grafted on the halogenated butyl rubber is at least 40,000. Preferably when the graft copolymer is used in tire tread formulations in order to obtain superior abrasion resistance and wet skid resistance upon vulcanization, the number average molecular weight of the polymer based upon conjugated diolefin monomers grafted onto the halogenated butyl rubber should be from about 55,000 to about 200,000, more preferably from about 70,000 to about 120,000.

The rubber compositions further comprise natural rubber and/or synthetic rubbery polymers based upon conjugated diolefinic monomers which are compatible and covulcanizable with the aforesaid graft copolymer. Preferably about 50 to about 90 parts by weight of at least one rubbery polymer selected from the group consisting of butadiene rubbers, styrene-butadiene random and block rubbery copolymers, isoprene rubber and natural rubber are mixed with about 10 to about 50 parts by weight of the graft copolymer for a total of 100 parts by weight of the polymers.

The use of carbon blacks for reinforcement of vulcanizates is well known in the art and results in improved strength properties of the final vulcanizates. Suitable carbon blacks for practicing this invention include the well known furnace and channel, preferably furnace, blacks and are used in amounts of from about 30 to about 150 parts by weight.

The curing system suitable for use in the present invention is not particularly restricted. A typical curing system comprises: (i) a metal oxide, (ii) optionally, elemental sulphur and (iii) at least one sulphur based accelerator. The use of metal oxides as a component is well known in the art. A suitable metal oxide is zinc oxide, which may be used in amounts of from about 1 to about 10, preferably from about 2 to about 5, parts by weight. Elemental sulphur, comprising component (ii) of said curing system, when present may be used in amounts of from about 0.2 to about 2 parts by weight. Suitable sulphur accelerators (component (iii) of said curing system) may be used in amounts of from about 0.5 to about 3 parts by weight and include the thiuram sulphides such as tetramethyl thiuram disulphide (TMTD), the thiocarbamates such as zinc dimethyl dithiocarbamate (ZDC) and the sulfenamides such as N-cyclohexyl-2-benzothiazol sulfenamide. Preferably the sulphur based accelerator is N-cyclohexyl-2-benzothiazole sulfenamide.

Stabilizers, anti-oxidants, hydrocarbon extender oils and tackifiers may also be added as is well known in the art of compounding.

The compositions according to the present invention can be prepared by the well known methods for mixing rubbery polymers including mixing on a rubber mill or in internal mixers of the Banbury or Brabender variety. Generally it is preferred to carry out the compounding procedure in two stages. In the first stage the polymers may be mixed with conventional compounding ingredients; these may include carbon black, hydrocarbon extender oil, tackifiers, stabilizers, processing acids and antioxidants. In the second stage of the compounding procedure, the cure active agents are preferably added to the compound described above on a rubber mill or in an internal mixer operated at a temperature not normally in excess of about 60° C. The compounds are cured in a conventional manner by heating from about 5 to about 60 minutes at temperatures of from about 150° C. to about 200° C. to form elastomeric vulcanizates.

After vulcanization, the rubber compositions hereinbefore described exhibit an improvement in abrasion resistance and wet skid resistance while maintaining a desirable balance of other physical properties. By an improvement in abrasion resistance is meant a higher value for the Akron Abrasion test and a lower value for the DIN Abrasion test and by an improvement in wet skid resistance is meant a higher value for the test based on ASTM E 303-74. By physical properties is meant hardness and elongation and strength properties which include modulus at 100 percent elongation, modulus at 300 percent elongation, tensile strength at rupture and tear strength. Accordingly said vulcanizates are suitable for use in tires which require improved abrasion resistance and wet skid resistance while maintaining a desirable balance of other properties.

The following examples illustrate the present invention and are not intended to limit the scope thereof. All parts are parts by weight unless otherwise specified.

The materials used were:
Chlorinated butyl rubber—commercial product sold as POLYSAR Chlorobutyl 1255
Low Cis polybutadiene—commercial product sold as DIENE 55
Styrene-butadiene random copolymer—commercial product sold as POLYSAR SBR 1500
Carbon black—commercial product N-339
Aromatic oil—commercial product sold as Sundex 790
Santocure CBS (N-cyclohexyl-2-benzothiazole sulfenamide), sulphur, stearic acid and zinc oxide were commercially available materials.

EXAMPLE 1

Lithium terminated polybutadiene was prepared under anhydrous and anaerobic conditions in a closed, glass reaction vessel. Butadiene (60 g, 1.11 mole) dissolved in cyclohexane (360 g, 4.29 mole) was charged to the reaction vessel together with a 1.6M solution of sec-butyl lithium (1.5 ml). The reaction vessel was heated to 50° C. and the polymerization was continued for 5 hours. An aliquot of the solution of the living polybutadiene was then removed and quenched by the addition of an excess of methyl alcohol. Analysis by gel permeation chromatography of the polybutadiene thus obtained indicated that the polymer had a number average molecular weight of 37,400 and a peak molecular weight of 38,900.

A solution of purified chlorinated butyl rubber (4.8 g) in dry cyclohexane (425 g) under a positive pressure of nitrogen was then transferred to a reaction vessel containing the freshly prepared lithium terminated polybutadiene (16.8 g) in cyclohexane (107.0 g) and the mixture was stirred vigorously at ambient temperature for 16 hours. The reaction was terminated by the addition of methanol (1 ml) and the antioxidant Irganox 1010 (0.001 g) was then added. The polymeric material was then isolated by coagulation with an excess of methanol and subsequently extracted with nitrobenzene in order to remove about 10 percent of the polybutadiene that had been added to the reaction mixture but which had failed to undergo reaction with the chlorinated butyl rubber. Following several washings with methanol, the polymeric material was dried under reduced pressure at a temperature of about 40° C. for 24 hours.

Analysis by gel permeation chromatography of the polymeric material thus obtained showed that the material had a peak molecular weight of 578,000 indicating that as the peak molecular weight of the base chlorinated butyl rubber was 447,000 reaction of the living polybutadiene with the chlorinated butyl rubber had occurred to afford a graft copolymer.

The peak molecular weight is that molecular weight corresponding to the maximum concentration in the polymer concentration - elution time gel permeation chromatogram and, for the purposes of this invention, where there are several peaks (corresponding to several compositional elements in the molecular weight distribution) the peak molecular weight is the molecular weight at the local maximum of the major component of the molecular weight distribution curve.

Using the aforementioned procedure, a second reaction was carried out in which the polybutadiene had a different number average molecular weight.

The results for the two experiments are given in the following table.

TABLE I

| | Amount (g) | $M_n \times 10^{-4}$ | $M_p \times 10^{-5}$ |
|---|---|---|---|
| Expt. 1 | | | |
| Living PBd | 16.8 | 3.74 | 0.389 |
| CIIR | 4.8 | — | 4.47 |
| Cyclohexane | 532.0 | — | — |
| Graft Copolymer | — | — | 5.78 |
| Expt. 2 | | | |
| Living PBd | 11.5 | 8.15 | 1.03 |
| CIIR | 11.5 | — | 3.56 |
| Cyclohexane | 460.0 | — | — |
| Graft Copolymer | — | — | 6.01 | where PBd = polybutadiene
CIIR = chlorinated butyl rubber
$M_n$ = number average molecular weight
$M_p$ = peak molecular weight

EXAMPLE 2

A graft copolymer having grafts of random styrene-butadiene copolymer on chlorinated butyl rubber was prepared according to the procedure of Example 1 with the exception that styrene monomer in the amount of 23 weight percent together with butadiene monomer in the amount of 77 weight percent was charged to the reaction vessel prior to polymerization of the random copolymer being initiated with sec-butyllithium.

The results of the experiment are given in the following table.

TABLE II

| Expt. 1 | Amount (g) | $M_n \times 10^{-5}$ | $M_p \times 10^{-5}$ | Mole % Styrene (NMR) |
|---|---|---|---|---|
| Living PSt-PBD | 11.5 | 1.03 | 1.50 | 13.6 |
| CIIR | 11.5 | — | 3.56 | — |
| Cyclohexane | 460.0 | — | — | — |
| Graft Copolymer | — | — | 4.59 | 5.9 | where PSt-PBd = polystyrene-polybutadiene random copolymer
CIIR = chlorinated butyl rubber
$M_n$ = number average molecular weight
$M_p$ = peak molecular weight An examination of the results provided in Table II shows that in Experiment 1 the peak molecular weight of the major component of the molecular weight distribution curve exhibits a significant shift towards higher molecular weight when compared with that of the base chlorinated butyl rubber indicating that the styrene-butadiene random copolymer has been grafted onto the chlorinated butyl rubber. Further evidence that the styrene-butadiene random copolymer has been grafted onto the chlorinated butyl rubber is afforded by the 200 MHz $^1$NMR spectrum which exhibits resonances due to the styrene moiety.

EXAMPLE 3

Two graft copolymers each having grafts of styrene-butadiene block copolymers on chlorinated butyl rubber were prepared in the following manner.

Styrene (15 g, 0.14 mole) dissolved in dry cyclohexane (360.0 g, 4.29 mole) was charged to a glass reaction vessel together with a 1.6M solution of sec-butyllithium (1.6 ml). The reaction vessel was heated to 50° C. and the polymerization allowed to proceed for 16 hours, at the end of which the reaction vessel was cooled to ambient temperature and charged with butadiene (15 g, 0.28 mole). Subsequently the reaction vessel was heated to 50° C. again and the polymerization allowed to continue for a further 5 hours before a solution of purified chlorinated butyl rubber in dry cyclohexane was added and the mixture stirred virogously at ambient temperature for 5 hours. The reaction was then terminated by the addition of methanol and the antioxidant Irganox 1010. Subsequent to isolation by coagulation with an excess of methanol, the polymeric material was extracted with methyl acetate in order to remove any unreacted styrene-butadiene block copolymer.

The results for the preparation of the two graft copolymers are given in the following table.

TABLE III

|  | Amount (g) | $M_n \times 10^{-4}$ | $M_p \times 10^{-5}$ |
|---|---|---|---|
| Expt. 1 |  |  |  |
| Living PSt-PBs | 3.72 | 0.495 | 0.87 |
| CIIR | 2.0 | — | 3.56 |
| Cyclohexane | 177.0 | — | — |
| Graft Copolymer | — | — | 15.8 |
| Expt. 2 |  |  |  |
| Living PSt-PBd | 3.72 | 0.575 | 1.1 |
| CIIR | 2.0 | — | 3.56 |
| Cyclohexane | 427.0 | — | — |
| Graft Copolymer | — | — | 18.3 | where PSt-PBd = polystyrene-polybutadiene block copolymer
CIIR = chlorinated butyl rubber
$M_n$ = number average molecular weight
$M_p$ = peak molecular weight An examination of the results in Table III shows that in each experiment the peak molecular weight of the product polymeric material exhibits a marked shift towards higher molecular weight when compared with that of the base chlorinated butyl rubber, indicating formation of the graft copolymer.

EXAMPLE 4

According to the procedure given in Example 1, three samples of chlorinated butyl rubber having a number average molecular weight of 114,000 and a weight average molecular weight of 246,000 were reacted with living polybutadienes having number average molecular weights of 11,000, 41,000 and 110,000 respectively to afford three graft copolymers A, B and C. Characterization of the grafts was accomplished by gel permeation chromatography and 250 MHz [1] NMR spectroscopy and the results are given in the following table.

TABLE IV

| Graft Copolymer | $M_n \times 10^{-5}$ | $M_w \times 10^{-5}$ | No. of Grafts | % CIIR (NMR) | % PBD (NMR) |
|---|---|---|---|---|---|
| A | 1.55 | 4.28 | 12 | 49 | 51 |
| B | 2.07 | 3.99 | 3 | 52 | 48 |
| C | 1.96 | 5.10 | 1 | 49 | 51 | where $M_n$ = number average molecular weight
$M_w$ = weight average molecular weight
CIIR = chlorinated butyl rubber
PBd = polybutadiene
No. of grafts = average number of polybutadiene grafts on each chlorinated butyl rubber backbone Using these three graft copolymers, three rubber compositions were prepared according to the recipes shown in Table V. Compounding was done by mixing in a Laboratory Banbury, Model "B" internal mixer operated at a starting temperature of 30° C. and a rotor speed of 77 revolutions per minute. The rubbery polymers were added to the mixer followed by half the amount of the carbon black and the Sundex 790 one minute later and the remainder of the carbon black and the stearic acid were added 30 seconds later. After a total mixing time of 4 minutes, the composition was dumped and cooled to room temperature. Compounding was completed by adding the remaining ingredients (sulphur, the accelerator and zinc oxide) on a two-roll rubber mill at 40° C. The compounded stock was formed into sheets and vulcanized for 30 minutes at 166° C.

TABLE V

|  | Control # | | | Sample # | |
|---|---|---|---|---|---|
|  | 1 | 2 | 3 | 1 | 2 |
| DIENE ® 55 | 100 | 80 | 60 | 60 | 60 |
| POLYSAR ® Chlorobutyl 1255 | — | 20 | — | — | — |
| Graft Copolymer A | — | — | 40 | — | — |
| Graft Copolymer B | — | — | — | 40 | — |
| Graft Copolymer C | — | — | — | — | 40 |
| Carbon Black N-339 | 50 | 50 | 50 | 50 | 50 |
| Stearic Acid | 1.5 | 1.5 | 1.5 | 1.5 | 1.5 |
| Sundex 790 | 5.0 | 5.0 | 5.0 | 5.0 | 5.0 |
| Zinc Oxide | 3.0 | 3.0 | 3.0 | 3.0 | 3.0 |
| Santocure | 0.8 | 0.8 | 0.8 | 0.8 | 0.8 |
| Sulphur | 1.4 | 1.4 | 1.4 | 1.4 | 1.4 |

Tensile strength, modulus at 100 percent and 300 percent elongation and ultimate elongation to break of the vulcanizates were determined according to ASTM D412-80. Hardness was determined using a type A Shore durometer according to ASTM D2240-81. Tear strength was determined using Dies "B" and "C" according to ASTM D624.

An indication of the hysteresis power loss in the vulcanizate as it flexes was obtained by carrying out the tan delta test. Measurements of tan delta at different temperatures give curves whose shape provide an indication of the performance of the vulcanizate with respect to traction and rolling resistance. According to the WLF principle, the tan delta measurements at different temperatures can be related to hysteresis losses in the vulcanizate when subjected to flexing at different frequencies. High temperature measurements indicate hysteresis losses on flexing at low frequencies while low temperature measurements indicate hysteresis losses on flexing at high frequencies. Rolling resistance is a low frequency flexing phenomenon, whereas traction is a high frequency flexing phenomenon. An ideal rubber vulcanizate for tire tread use has a high value of tan delta at 0° C., indicating good traction, and a low value of tan delta at 56° C. and 100° C., indicating low rolling resistance.

The abrasion resistance of the vulcanizates was determined by two tests, the Akron Abrasion and the DIN Abrasion. The Akron Abrasion is determined by rotation of a rubber wheel against a standard grinding wheel and comparison of the weight loss to that of a standard rubber wheel. The test is conducted at two angles of contact. Because the standard rubber wheel wear resistance is set at 100 percent, the higher the number the better the resistance to wear. The DIN Abrasion is a standard test DIN 53516, the volume of rubber abraded being reported. Thus, the lower the number the better the resistance to wear.

The wet skid resistance was determined by a test based on ASTM E 303-74 in which a dynamic pendulum impact-type tester is used to measure the energy loss when a rubber slider is propelled over a test surface. In order to measure wet skid resistance a sample of the vulcanizate, 2.54 cm. in breadth, 9.8 cm. in length and 0.635 cm. in depth, is first "broken in" on a rough cement surface and is then tested on a rough wet asphalt surface and the result compared with control samples of synthetic rubbers and natural rubber. The lower the number the more slippery the compound.

TABLE VI

| VULCANIZATE PROPERTY | Control # | | | Sample # | |
|---|---|---|---|---|---|
| | 1 | 2 | 3 | 1 | 2 |
| Hardness, Shore A | 66 | 67 | 61 | 67 | 65 |
| 100% Modulus, MPa | 2.0 | 2.3 | 1.9 | 2.3 | 2.2 |
| 300% Modulus, MPa | 6.8 | 10.1 | 7.0 | 9.8 | 9.6 |
| Tensile Strength, MPa | 14.2 | 16.4 | 8.8 | 10.7 | 16.8 |
| Elongation, % | 480 | 410 | 355 | 325 | 440 |
| Tear strength (at room temp., KN/m) Die "B" | 54.9 | 48.6 | 32.0 | 40.6 | 49.0 |
| Die "C" | 37.1 | 34.0 | 22.4 | 27.5 | 30.9 |
| Akron Abrasion 15° % | 138 | 91 | 30 | 114 | 109 |
| 20° % | 356 | 180 | 56 | 270 | 245 |
| DIN Abrasion mm³ | 43 | 56 | 122 | 58 | 23 |
| Skid resistance (wet rough asphalt) | 35 | 40 | 45 | 40 | 45 |
| Tan delta at 0° C., 11 H$_z$ | 0.112 | 0.177 | 0.203 | 0.167 | 0.166 |

An examination of the results provided in Table III shows that the DIN abrasion resistance of sample No. 2 is superior to that of sample No. 1 and the three control compounds while the Akron abrasion resistance of both samples No. 1 and 2 is superior to that of control compounds No. 2 and No. 3 but is slightly worse than that of control compound No. 1 which does not contain any chlorinated butyl rubber. In addition the wet skid resistance of sample No. 2 is shown to be superior to that of control compounds Nos. 1 and 2 and comparable with that of control compound No. 3. Furthermore, the modulus, tensile strength and percent elongation of sample No. 2 are very similar to those of control compounds Nos. 1 and 2 and superior to those of control compound No. 3. Thus the results indicate that a rubber composition wherein the graft copolymer consists essentially of a chlorinated butyl rubber grafted with a polybutadiene having a number average molecular weight of from about 55,000 to about 200,000, upon vulcanization exhibits superior abrasion resistance and wet skid resistance relative to a simple mechanical blend of the component polymers while maintaining a desirable balance of other physical properties.

EXAMPLE 5

According to the procedure given in Example 4 three further rubber compositions using the graft copolymers A, B and C having polybutadiene grafts with number average molecular weights of 11,000, 41,000 and 110,000 respectively, were prepared according to the recipes shown in table VII.

TABLE VIII

| | Control # | | | Sample # | | |
|---|---|---|---|---|---|---|
| | 1 | 2 | 3 | 4 | 5 | 6 |
| POLYSAR ® SBR | 80 | 60 | 60 | 60 | 60 | 60 |
| POLYSAR ® Chlorobutyl 1245 | 20 | 20 | | | | 10 |
| DIENE ® 55 | | 20 | | | | 10 |
| Graft Copolymer A | | | 40 | | | |
| Graft Copolymer B | | | | 40 | | |
| Graft Copolymer C | | | | | 40 | 20 |
| Carbon Black N-339 | 50 | 50 | 50 | 50 | 50 | 50 |
| Stearic Acid | 1.5 | 1.5 | 1.5 | 1.5 | 1.5 | 1.5 |
| Sundex 790 | 10.0 | 10.0 | 10.0 | 10.0 | 10.0 | 10.0 |
| Zinc Oxide | 3.0 | 3.0 | 3.0 | 3.0 | 3.0 | 3.0 |
| Santocure | 0.8 | 0.8 | 0.8 | 0.8 | 0.8 | 0.8 |
| Sulphur | 1.4 | 1.4 | 1.4 | 1.4 | 1.4 | 1.4 |

The physical properties of the vulcanizates of these rubber compositions were then tested according to the procedures given in Example 4 and the results are presented in Table VIII.

TABLE VIII

| Vulcanizate Property | Control # | | | Sample # | | |
|---|---|---|---|---|---|---|
| | 1 | 2 | 3 | 4 | 5 | 6 |
| Hardness, Shore A | 65 | 65 | 61 | 66 | 67 | 67 |
| 100% Modulus, MPa | 2.5 | 2.2 | 1.5 | 2.5 | 2.4 | 2.4 |
| 300% Modulus, MPa | 12.9 | 11.3 | 8.2 | 13.7 | 13.2 | 13.1 |
| Tensile Strength MPa | 17.6 | 19.8 | 15.7 | 20.6 | 22.4 | 22.3 |
| Elongation, % | 385 | 470 | 470 | 420 | 455 | 470 |
| Akron Abrasion 15° % | 96 | 98 | 81 | 107 | 115 | 109 |
| DIN Abrasion mm³ | 123 | 116 | 146 | 99 | 91 | 95 |

An examination of the results provided in Table VII shows that the DIN abrasion resistance of samples No. 1, 2 and 3 is superior to that of control compounds No. 1, 2 and 3. Similarly the Akron abrasion resistance of samples No. 1, 2 and is superior to that of control compounds No. 1, 2 and 3. Furthermore, the modulus, tensile strength and percent elongation of samples No. 1,2 and 3 are similar to those of control compounds No. 1 and 2. Thus the use of a graft copolymer consisting essentially of a chlorinated butyl rubber grafted with a polybutadiene having a number average molecular weight of at least 40,000 in a rubber composition affords a vulcanizate that exhibits superior abrasion resistance relative to a simple mechanical blend of the component polymers while maintaining a desirable balance of other properties.

What is claimed is:

1. A process for preparing graft copolymers of halogenated butyl rubbers and polymers based on conjugated diolefin monomers without the formation of a substantial amount of gel which process comprises:
   (i) providing a first solution in an inert organic solvent of a halogenated butyl rubber selected from the group consisting of chlorinated butyl rubber and brominated butyl rubber, the amount of halogenated butyl rubber in said solution being from about 0.5 to about 5 parts by weight per 100 parts by weight of inert organic solvent,
   (ii) providing a second solution compatible with said first solution in an inert organic solvent which may or may not be the same as the inert organic solvent of step (i) of a living alkali metal terminated polymer based on conjugated diolefin monomers and having a number average molecular weight of at least 40,000, the amount of said living polymer in said second solution being from about 1 to about 20 parts by weight per 100 parts by weight of inert organic solvent,
   (iii) mixing at a temperature of from about $-10°$ C. to about 80° C. for a time period of from about 30 minutes to about 24 hours said first solution with said second solution in relative proportions whereby the weight of grafted polymer based on conjugated diolefin monomers is from about 5 to about 55 weight percent of the total of halogenated butyl rubber and said grafted polymer, and
   (iv) recovering from the solution the graft copolymer.

2. The process of claim 1 wherein said living alkali metal terminated polymer is a living lithium terminated polymer.

3. The process of claim 2 wherein the number average molecular weight of the living lithium terminated polymer is from about 55,000 to about 200,000.

4. The process of claim 3 wherein the solution of halogenated butyl rubber is purified by successive washings with a basic solution, an acidic solution and water, followed by centrifugation.

5. The process of claim 4 wherein the solution of halogenated butyl rubber is purified by successive washings with an aqueous sodium hydroxide solution of about 10 weight percent, an aqueous hydrochloric acid solution of about 5 weight percent and water, followed by centrifugation.

6. The process of claim 3 wherein said halogenated butyl rubber is chlorinated butyl rubber having a chlorine content of of from about 0.75 to about 1.75 weight percent chlorine based on the chlorinated butyl rubber.

7. The process of claim 3 wherein said polymer based on conjugated diolefin monomers is a polymer based on at least one monomer selected from the group consisting of $C_4$ to $C_8$ conjugated diolefins.

8. The process of claim 7 further including a monomer selected from the group consisting of $C_8$ to $C_{20}$ vinyl aromatic monomers.

9. The process of claim 8 wherein said polymer based on conjugated diolefin monomers is a polymer based on at least one monomer selected from butadiene and isoprene, and on styrene.

10. The process of claim 9 wherein said polymer based on conjugated diolefin monomers is polybutadiene.

11. The process of claim 1 wherein said inert organic solvent in step (i) and step (ii) is selected from the group consisting of $C_5$ to $C_8$ aliphatic hydrocarbons, $C_5$ to $C_{10}$ cyclic hydrocarbons, $C_7$ and $C_8$ aromatic hydrocarbons and mixtures thereof.

12. The process of claim 11 wherein said inert organic solvent is selected from hexane, heptane, cyclohexane, methylcyclohexane and mixtures thereof.

13. The process of claim 1 which process comprises:
   (i) providing a first solution in an inert organic solvent selected from the group consisting of hexane and cyclohexane of a chlorinated butyl rubber, purified by successive washings with a basic solution, an acidic solution and water, followed by centrifugation, the amount of chlorinated butyl rubber in said solution being from about 0.5 to about 5 parts by weight per 100 parts by weight of inert organic solvent,
   (ii) providing a second solution in an inert organic solvent selected from the group consisting of hexane, heptane, cyclohexane and methyl cyclohexane of living lithium terminated polybutadiene having a number average molecular weight of from about 55,000 to about 200,000, the amount of said polybutadiene in said second solution being from about 1 to about 20 parts by weight per 100 parts by weight of inert organic solvent,
   (iii) mixing at a temperature of from about $-10°$ C. to about 80° C. for a time period of from about 30 minutes to about 24 hours said first solution with said second solution in relative proportions whereby the weight of grafted polybutadiene is from about 5 to about 55 weight percent of the total of chlorinated butyl rubber and said grafted polybutadiene, and
   (iv) recovering from the solution the graft copolymer.

14. A rubber composition having superior abrasion resistance and wet skid resistance upon vulcanization, said composition comprising
   i) about 10 to about 50 parts by weight of a graft copolymer consisting essentially of a halogenated butyl rubber having grafted thereon a polymer based on conjugated diolefin monomers and having a number average molecular weight of from about 55,000 to about 200,000 said polymer selected from the group consisting of butadiene rubbers, isoprene rubber, styrene-butadiene random and block rubbery copolymers, styrene-isoprene-butadiene rubber and mixtures thereof,
   ii) about 50 to about 90 parts by weight of at least one rubber selected from the group consisting of butadiene rubbers, styrene-butadiene random and block rubbery copolymers, isoprene rubber and natural rubber,
   for a total of 100 parts by weight of (i) and (ii),
      iii) about 30 to about 150 parts by weight of carbon black based on 100 parts by weight of the total of (i) and (ii), and
      iv) vulcanization reagents.

15. The rubber composition of claim 14 wherein said polymer based on conjugated diolefin monomers has a number average molecular weight of from about 70,000 to about 120,000.

16. The rubber composition of claim 15 wherein said polymer based on conjugated diolefin monomers is a polymer selected from the group consisting of butadiene rubbers, styrene-butadiene random copolymers and mixtures thereof.

17. The rubber composition of claim 16 further including a hydrocarbon oil compatible with the graft rubbery copolymer of (i) and the rubber of (ii), in amounts of from about 4 to about 25 parts by weight per 100 parts by weight of (i) and (ii).

18. The rubber composition of claim 17 wherein said vulcanization reagents comprise from about 1 to about 10 parts by weight of zinc oxide, from about 0.2 to about 2 parts by weight of elemental sulphur and from about 0.5 to about 3 parts by weight of at least one sulphur based accelerator.

19. The rubber composition of claim 18 wherein the amount of zinc oxide is from about 2 to about 5 parts by weight.

20. The rubber composition of claim 19 wherein said halogenated butyl rubber is chlorinated butyl rubber with a chlorine content of from about 0.75 to about 1.75 weight percent chlorine based on the chlorinated butyl rubber.

21. Vulcanizates of the rubber composition of claim 20.

22. A process for producing a vulcanizate having superior abrasion resistance and wet skid resistance which comprises:
(A) mixing about 10 to about 50 parts by weight of a graft copolymer consisting essentially of a halogenated butyl rubber having grafted thereon a polymer based on conjugated diolefin monomers and having a number average molecular weight of from about 55,000 to about 200,000 said polymer selected from the group consisting of butadiene rubbers, isoprene rubber, styrene-butadiene random and block rubbery copolymers, styrene-isoprene-butadiene rubbers and mixtures thereof with about 50 to about 90 parts by weight of at least one rubber selected from the group consisting of butadiene rubbers, styrene-butadiene random and block rubbery copolymers, isoprene rubber and natural rubber, about 30 to 150 parts by weight of carbon black and a vulcanization reagents,
(B) forming the mixture produced in (A) into a sheet, and
(C) vulcanizing the sheet formed in (B) at a temperature of from about 150° C. for from about 5 to about 60 minutes.

* * * * *